US012564137B2

(12) United States Patent
Schinstock et al.

(10) Patent No.: US 12,564,137 B2
(45) Date of Patent: Mar. 3, 2026

(54) CENTER DELIVERY RAKE IMPLEMENT

(71) Applicant: DEERE & COMPANY, Moline, IL (US)

(72) Inventors: William P. Schinstock, Ottumwa, IA (US); Kenneth W. Hulet, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 792 days.

(21) Appl. No.: 17/821,941

(22) Filed: Aug. 24, 2022

(65) Prior Publication Data

US 2024/0065167 A1 Feb. 29, 2024

(51) Int. Cl.
*A01D 78/14* (2006.01)

(52) U.S. Cl.
CPC ........... *A01D 78/146* (2013.01); *A01D 78/14* (2013.01)

(58) Field of Classification Search
CPC ........ A01D 78/00–78/20; A01D 80/00–80/02; A01D 78/14; A01D 78/146; A01B 73/06–73/067
See application file for complete search history.

(56) References Cited

U.S. PATENT DOCUMENTS

| | | | | |
|---|---|---|---|---|
| 2,680,343 | A * | 6/1954 | Enos, Jr. ............... | A01D 78/142 |
| | | | | 56/377 |
| 2,683,345 | A * | 7/1954 | Meyer .................. | A01D 78/146 |
| | | | | 56/377 |
| 4,932,197 | A * | 6/1990 | Allen ................... | A01D 78/146 |
| | | | | 56/228 |

| | | | | |
|---|---|---|---|---|
| 6,212,866 | B1 * | 4/2001 | Rowse ................. | A01D 78/146 |
| | | | | 56/384 |
| 7,540,139 | B2 * | 6/2009 | Rowse ................. | A01D 78/146 |
| | | | | 56/377 |
| 7,584,595 | B2 * | 9/2009 | Marggi ................ | A01B 73/067 |
| | | | | 56/375 |
| 8,146,338 | B1 * | 4/2012 | Cicci ................... | A01D 78/146 |
| | | | | 56/385 |
| 12,137,636 | B1 * | 11/2024 | Wentz .................. | A01D 78/146 |
| 2013/0263567 | A1 | 10/2013 | Bassett et al. | |
| 2017/0105330 | A1 * | 4/2017 | Mashburn ............. | A01D 78/14 |
| 2019/0380255 | A1 * | 12/2019 | Higel .................. | A01B 73/048 |

FOREIGN PATENT DOCUMENTS

| | | | | |
|---|---|---|---|---|
| DE | 102006042552 A1 * | 10/2007 | ......... | A01D 78/1007 |
| EP | 1839480 A1 * | 10/2007 | ......... | A01D 78/1007 |
| WO | WO 2017136439 A1 | 8/2017 | | |

OTHER PUBLICATIONS

Extended European Search Report and Written Opinion issued in European Patent Application No. 23190536.5, dated Jan. 31, 2024, in 10 pages.
John Deere, WR30-WR31-WR12 Hay Rake Brochure, pp. 1-8.
H&S, X & HDX Rakes, Brochure, pp. 1-6.

* cited by examiner

*Primary Examiner* — Joseph M Rocca
*Assistant Examiner* — Madeline I Runco

(57) ABSTRACT

A rake implement includes a first arm and a second arm. A first linkage system interconnects and is selectively configurable to position the first arm in a travel position, a first operating position, and a second operating position. A second linkage system is selectively configurable to position the second arm in a travel position, a first operating position and a second operating position. The first arm and the second arm may be positioned in different respective operating positions to provide different rake configurations for different field conditions.

22 Claims, 4 Drawing Sheets

CENTER DELIVERY RAKE IMPLEMENT

TECHNICAL FIELD

The disclosure generally relates to a rake implement for moving cut crop material laterally to form a windrow.

BACKGROUND

Rake implements are generally drawn by a tow vehicle, e.g., a tractor, and operate to move cut crop material laterally relative to a direction of travel and form the crop material into a windrow. A desirable factor of moving the cut crop material into a single windrow includes disturbing the crop material during movement, thereby increasing air circulation around the cut crop material and decreasing dry-down time.

The rake implement may be configured as a side delivery implement, in which the windrow is formed on a lateral side of the tow vehicle, i.e., either the left side or the right side of the tow vehicle relative to a longitudinal centerline of the tow vehicle. In other implementations, the rake implement may be configured as a center delivery implement, in which the windrow is formed approximately on the longitudinal centerline of the tow vehicle.

A rake implement configured as a center delivery implement typically includes a left arm and a right arm. The left arm has a rake system that gathers cut crop material from the left side of the tow vehicle and moves the crop material onto the approximate centerline of the tow vehicle. The right arm has a respective rake system that gathers cut crop material from the right side of the tow vehicle and moves the crop material onto the approximate centerline of the tow vehicle, whereby the crop material from the left side and the right side may be combined into a single windrow generally aligned with the centerline of the tow vehicle.

When the rake implement is configured as a center delivery implement having both the left arm and the right arm, the left and right arms are generally pivotably attached to a structure and movable between a transport position and a V-shaped operating position. When disposed in the V-shaped operating position, the rearward ends of the first arm and the second arm are generally spaced apart from each other, such that the crop material disposed between the left arm and the right arm, at the general apex of the V-shaped operating position, is not disturbed. Additionally, if the distance between the rearward ends of the left arm and the right arm is too great, or the volume of crop is small, the crop material may not be formed into a single windrow.

Such rake implements are constructed to provide a single operating configuration, and may further be configured into a transport position. While the single operating configuration may work well in some situations, the single operating configuration of the rake implement may be less optimal for other situations. In other words, typical rake implements fail to provide multiple operating configurations to operate optimally in several different operating scenarios.

SUMMARY

A rake implement for moving cut crop material laterally to form a windrow is provided. The rake implement includes a frame having a tongue configured for attachment to a tow vehicle. The frame extends along a central longitudinal axis parallel with a direction of travel. The central longitudinal axis bisects the frame to define a first lateral side of the frame and a second lateral side of the frame. A first arm includes a forward end and a rearward end relative to the direction of travel. The first arm supports a first rake system. A first linkage system interconnects the frame and the first arm. The first linkage system is selectively configurable to position the first arm relative to the frame in a travel position of the first arm, a first operating position of the first arm, and a second operating position of the first arm. The first linkage system is selectively configurable to position the first arm in the transport position of the first arm to reduce an implement width on the first lateral side of the frame for transport. The first linkage system is selectively configurable to position the first arm relative to the frame in the first operating position of the first arm in which the first arm is substantially non-parallel with the central longitudinal axis and extends away from the frame at an acute angle relative to the central longitudinal axis. The first linkage system is selectively configurable to position the first arm relative to the frame in a second operating position of the first arm in which the first arm is substantially non-parallel with the central longitudinal axis and extends away from the frame at the acute angle relative to the central longitudinal axis. The acute angle of the first arm when disposed in the first operating position of the first arm may be different than the acute angle of the first arm when disposed in the second operating position of the first arm.

In one implementation of the disclosure, both a rearward end and a forward end of the first rake system are positioned on the first lateral side of the frame when the first arm is disposed in the first operating position of the first arm. When the first arm is disposed in the second operating position of the first arm, the rearward end of the first rake system may be positioned on the second lateral side of the frame and the forward end of the first rake system may be positioned on the first lateral side of the frame.

In another implementation of the disclosure, both the rearward end and the forward end of the first rake system may be positioned on the first lateral side of the frame when the first arm is disposed in either the first operating position of the first arm or the second operating position of the first arm. However, the first arm may be positioned relative to the frame to define an acute angle relative to the central longitudinal axis when disposed in the first operating position of the first arm and the second operating position of the first arm. The acute angle of the first arm when disposed in the first operating position of the first arm may be different than the acute angle of the first arm when disposed in the second operating position of the first arm.

In one aspect of the disclosure, the rake implement may further include a second arm. The second arm includes a forward end and a rearward end relative to the direction of travel. The second arm supports a second rake system. A second linkage system interconnects the frame and the second arm. The second linkage system is selectively configurable to position the second arm relative to the frame in a travel position of the second arm, a first operating position of the second arm, or a second operating position of the second arm. When the second linkage system is configured to position the second arm in the travel position of the second arm, the second arm is positioned to reduce implement width on the second lateral side of the frame for transport. When the second linkage system is selectively configured to position the second arm relative to the frame in the first operating position of the second arm, the second arm is substantially non-parallel with the central longitudinal axis and extends away from the frame at an acute angle relative to the central longitudinal axis. When the second linkage system is selectively configurable to position the second arm relative to the frame in the second operating position of the second arm, the second arm is substantially non-parallel with the central longitudinal axis and extends away from the frame at the acute angle relative to the central longitudinal axis. The acute angle of the second arm when disposed in the first operating position of the second arm may be different than the acute angle of the second arm when disposed in the second operating position of the second arm.

In one implementation of the disclosure, when the first arm is disposed in the first operating position of the first arm and the second arm is disposed in the second operating position of the second arm, the acute angle of the second arm relative to the central longitudinal axis may be smaller than the acute angle of the first arm relative to the central longitudinal axis. Similarly, when the first arm is disposed in the second operating position of the first arm and the second arm is disposed in the first operating position of the second arm, the acute angle of the first arm relative to the central longitudinal axis may be smaller than the acute angle of the second arm relative to the central longitudinal axis.

In one implementation of the disclosure, both a rearward end and a forward end of the second rake system may be positioned on the second lateral side of the frame when the second arm is disposed in the first operating position of the second arm. When the second arm is disposed in the second operating position of the second arm, the rearward end of the second rake system may be positioned on the first lateral side of the frame and the forward end of the second rake system may be positioned on the second lateral side of the frame.

In another implementation of the disclosure, both the rearward end and the forward end of the second rake system may be positioned on the second lateral side of the frame when the second arm is disposed in either the first operating position of the second arm or the second operating position of the second arm. However, the second arm may be positioned relative to the frame to define an acute angle relative to the central longitudinal axis when disposed in the first operating position of the second arm and the second operating position of the second arm. The acute angle of the second arm when disposed in the first operating position of the second arm may be different than the acute angle of the second arm when disposed in the second operating position of the second arm.

In one implementation of the disclosure, when the first arm is disposed in the first operating position of the first arm and the second arm is disposed in the second operating position of the second arm, the rearward end of the first arm may be positioned forward of the rearward end of the second arm along the central longitudinal axis, with a rearward end of the first rake system positioned to overlap with a rearward end of the second rake system in a direction generally perpendicular to the central longitudinal axis.

In another implementation of the disclosure, when the first arm is disposed in the second operating position of the first arm and the second arm is disposed in the first operating position of the second arm, the rearward end of the second arm may be positioned forward of the rearward end of the first arm along the central longitudinal axis, with the rearward end of the second rake system positioned to overlap with the rearward end of the first rake system in a direction generally perpendicular to the central longitudinal axis.

In another implementation of the disclosure, when the first arm is disposed in the second operating position of the first arm and the second arm is disposed in the second operating position of the second arm, the rearward end of the first arm and the rearward end of the second arm may be substantially aligned with each other at a common axial position on the central longitudinal axis. Additionally, the rearward end of the first arm and the rearward end of the second arm may be laterally spaced from each other in a direction generally perpendicular to the central longitudinal axis.

In one aspect of the disclosure, the first linkage system may include, but is not limited to, a plurality of linkage bars. For example, the first linkage system may include, but is not limited to, four linkage bars cooperating with the frame and the first arm to define a six link connection system. Similarly, the second linkage system may include, but is not limited to, a plurality of linkage bars. For example, the second linkage system may include, but is not limited to, four linkage bars cooperating with the frame and the second arm to define a six link connection system.

In one implementation of the disclosure, the first linkage system and the second linkage system may be connected and simultaneously moveable in a coordinated motion to move the first arm and the second arm between at least two of their respective travel positions, their respective first operating positions, or their respective second operating positions.

In one aspect of the disclosure, the rake implement may include a first actuator system interconnecting the frame and the first linkage system. The first actuator system may be configured to move the first linkage system to move the first arm between the travel position of the first arm, the first operating position of the first arm, and the second operating position of the first arm. Similarly, the rake implement may include a second actuator system interconnecting the frame and the second linkage system. The second actuator system may be configured to move the second linkage system to move the second arm between the travel position of the second arm, the first operating position of the second arm, and the second operating position of the second arm.

In one aspect of the disclosure, the first rake system is operable to move crop material laterally relative to the central longitudinal axis, from the forward end of the first arm toward the rearward end of the first arm. Similarly, the second rake system is operable to move crop material laterally relative to the central longitudinal axis, from the forward end of the second arm toward the rearward end of the second arm.

In one implementation of the disclosure, the first arm may be substantially parallel with the central longitudinal axis when the first arm is disposed in the transport position of the first arm. Similarly, the second arm may be substantially parallel with the central longitudinal axis when the second arm is disposed in the transport position of the second arm. However, in other implementations, the first arm and the second arm need not be substantially parallel with the central longitudinal axis while in their respective travel positions.

In one aspect of the disclosure, the first arm defines a lateral implement transport width on the first lateral side of the frame when the first arm is disposed in the transport position of the first arm. The first arm defines a lateral implement deployed width on the first lateral side of the frame when the first arm is disposed in the first operating position of the first arm or the second operating position of the first arm. The lateral implement transport width of the first arm less than the lateral implement deployed width of the first arm. Similarly, the second arm defines a lateral implement transport width on the second lateral side of the frame when the second arm is disposed in the transport position of the second arm. The second arm defines a lateral implement deployed width on the second lateral side of the frame when the second arm is disposed in the first operating position of the second arm or the second operating position of the second arm. The lateral implement transport width of the second arm less than the lateral implement deployed width of the second arm.

Accordingly, the rake implement described herein is configurable into several different configurations to provide a traditional V-shaped center delivery configuration or a full width center delivery rake that fully disturbs the cut crop material across an entire rake width of the rake implement, and that is capable for forming the crop material into a single windrow regardless of the density/volume of the cut crop material.

The above features and advantages and other features and advantages of the present teachings are readily apparent from the following detailed description of the best modes for carrying out the teachings when taken in connection with the accompanying drawings.

DETAILED DESCRIPTION

Figure 1:
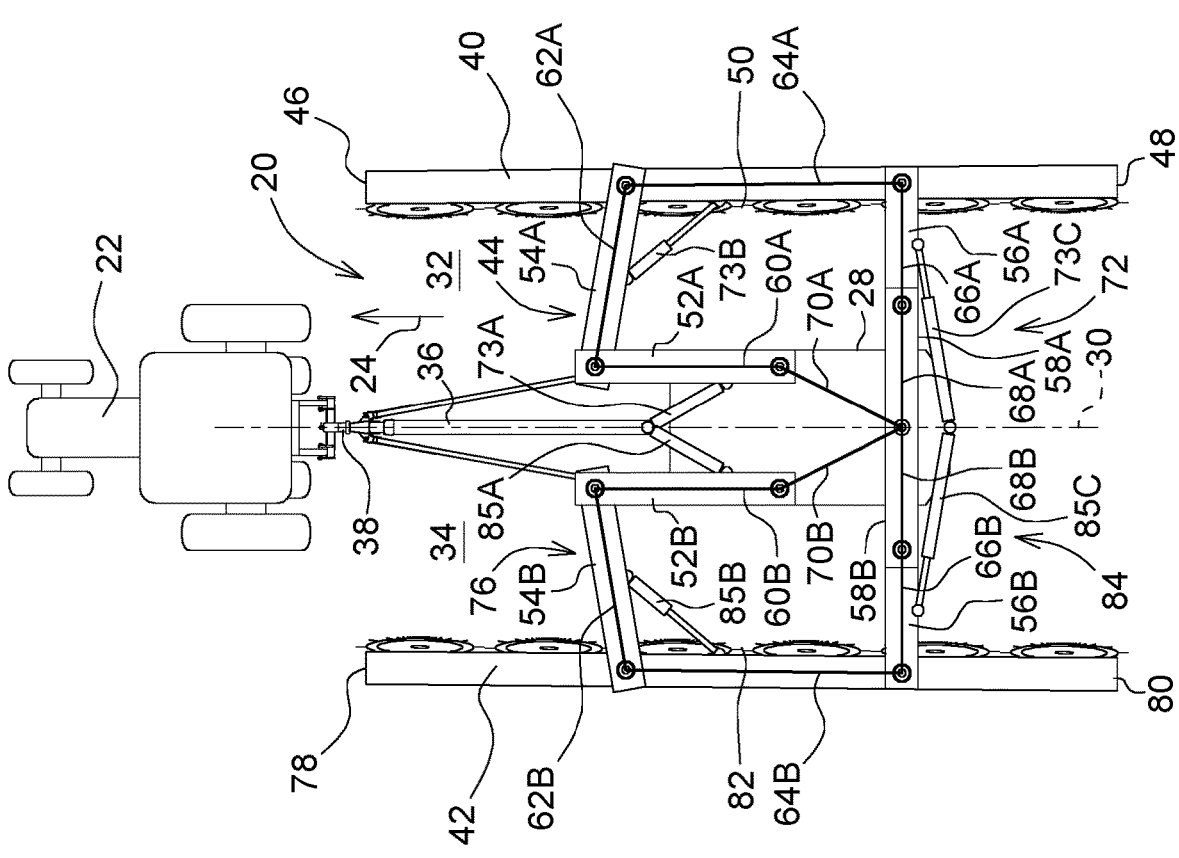
FIG. 1 is a schematic plan view of a rake implement in a travel configuration.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate like parts throughout the several views, a rake implement is generally shown at 20. The rake implement 20 may be pulled or drawn by a tow vehicle 22, such as but not limited to a tractor, through a field to move cut crop material laterally relative to a direction of travel 24 to form a windrow 26. While the rake implement 20 is generally described below as being implemented as a carted rake style implement, as understood by those skilled in the art, it should be appreciated that the teachings of this disclosure may be applied to other implementations of the rake implement 20, such as but not limited to an overhead frame style implement, as understood by those skilled in the art.

The rake implement 20 includes a frame 28. The frame 28 may be manufactured from several different components attached together to form a rigid structure capable of supporting the various components of the rake implement 20. Additionally, the frame 28 may include one or more ground engaging elements, such as but not limited to tires and/or tracks, for moveably supporting the frame 28 relative to a ground surface. The frame 28 extends along a central longitudinal axis 30 that is generally parallel with the direction of travel 24 of the rake implement 20 during operation. As used herein, the terms forward, rearward, left, and right are used relative to the direction of travel 24 of the rake implement 20 during operation. The central longitudinal axis 30 of the frame 28 bisects the frame 28 to define a first lateral side 32 of the frame 28, e.g., a right side of the frame 28, and a second lateral side 34 of the frame 28, e.g., a left side of the frame 28.

The frame 28 includes a tongue 36 that extends outward from the frame 28 in a forward direction. The tongue 36 is configured for attachment to the tow vehicle 22. For example, the tongue 36 may include a hitch system 38 located proximate the forward end 46 78 of the tongue 36 that is configured for attachment to the tow vehicle 22. The hitch system 38 may include, but is not limited to, a three point hitch, a two point hitch, a drawbar, etc. The features and operation of the hitch system 38 are understood by those skilled in the art, not pertinent to the teachings of this disclosure, and are therefore not described in greater detail herein.

The rake implement 20 includes a first arm 40 and a second arm 42. A first linkage system 44 interconnects the frame 28 and the first arm 40. The first arm 40 is disposed on the first lateral side 32 of the frame 28, and includes a forward end 46 and a rearward end 48 relative to the direction of travel 24. The first arm 40 may include one or more ground engaging elements, such as but not limited to tires and/or tracks, for moveably supporting the first arm 40 relative to the ground surface.

The first arm 40 includes a structure that supports a first rake system 50. The first rake system 50 is disposed on the first arm 40 and is operable to move cut crop material laterally relative to the central longitudinal axis 30. The first rake system 50 is operable to move the cut crop material from the forward end 46 of the first arm 40, inward toward the central longitudinal axis 30 and the rearward end 48 of the first arm 40. The first rake system 50 may include, but is not limited to, one or more wheel type rakes and/or a parallel bar type rake as understood by those skilled in the art. The specific features and operation of the first rake system 50 are understood by those skilled in the art, are not pertinent to the teachings of this disclosure, and are therefore not described in greater detail herein.

As described above, the first linkage system 44 interconnects the frame 28 and the first arm 40. The first linkage system 44 may include any system that moveable connects the first arm 40 to the frame 28 in a manner that enables both lateral and longitudinal movement of the rearward end 48 of the first arm 40 relative to the central longitudinal axis 30 of the frame 28. For example, the first linkage system 44 may include a plurality of linkage bars interconnecting the first arm 40 and the frame 28. In the example implementation shown in the Figures, the first linkage system 44 includes four linkage bars cooperating with the frame 28 and the first arm 40 to define a six link connection system. The four linkage bars include a first bar 52A, a second bar 54A, a third bar 56A, and a fourth bar 58A. The first bar 52A is pivotably connected to the frame 28 and pivotably connected to the second bar 54A. The second bar 54A is pivotably connected to the first bar 52A and pivotably connected to the first arm 40. The third bar 56A is pivotably connected to the first arm 40 and pivotably connected to the fourth bar 58A. The fourth bar 58A is pivotably connected to the third bar 56A and pivotably connected to the frame 28.

The six links defined by the frame 28 and the first linkage system 44 include a first link 60A, a second link 62A, a third link 64A, a fourth link 66A, a fifth link 68A, and a sixth link 70A. The first link 60A is defined by the first bar 52A and extends between the frame 28 and the second bar 54A. The second link 62A is defined by the second bar 54A and extends between the first bar 52A and the first arm 40. The third link 64A is defined by the first arm 40 and extends between the second bar 54A and the third bar 56A. The fourth link 66A is defined by the third bar 56A and extends between the first arm 40 and the fourth bar 58A. The fifth link 68A is defined by the fourth bar 58A and extends between the third bar 56A and the frame 28. The sixth link 70A is defined by the frame 28 and extends between the fourth bar 58A and the first bar 52A.

The rake implement 20 includes a first actuator system 72 interconnecting the frame 28 and one of the plurality of linkage bars of the first linkage system 44. It should be appreciated that the first actuator system 72 may include multiple actuators. For example, the first actuator system 72 may include a first actuator 73A, a second actuator 73B and a third actuator 73C. The actuators 73A, 73B, 73C may include, but are not limited to, one of a hydraulic actuator, an electric actuator, a pneumatic actuator, etc. The actuators 73A, 73B, 73C may be configured as one of a linear actuator that generates linear movement, or a rotary actuator that generates rotational movement.

Figure 2:
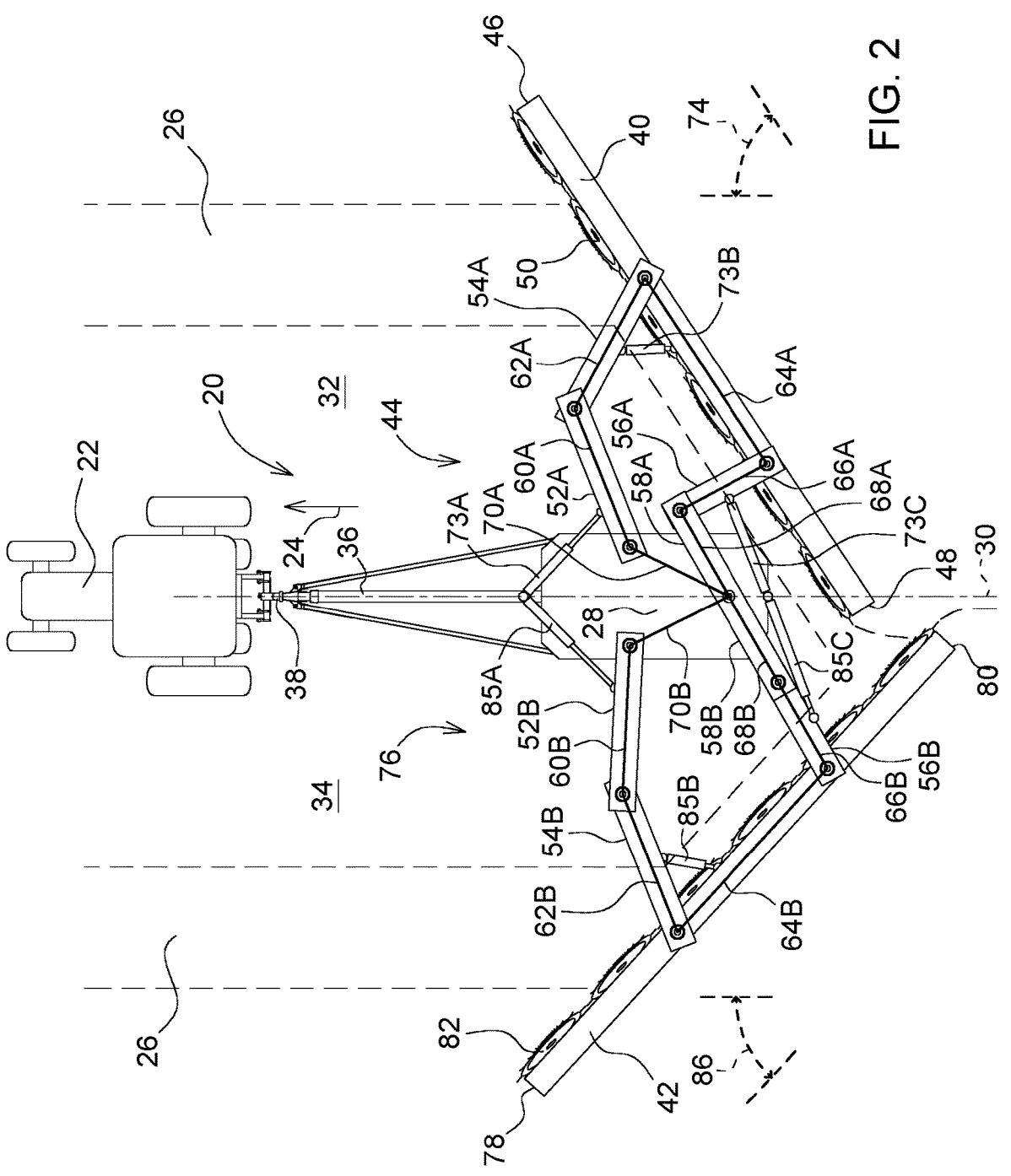
FIG. 2 is a schematic plan view of the rake implement in a first configuration.
Figure 3:
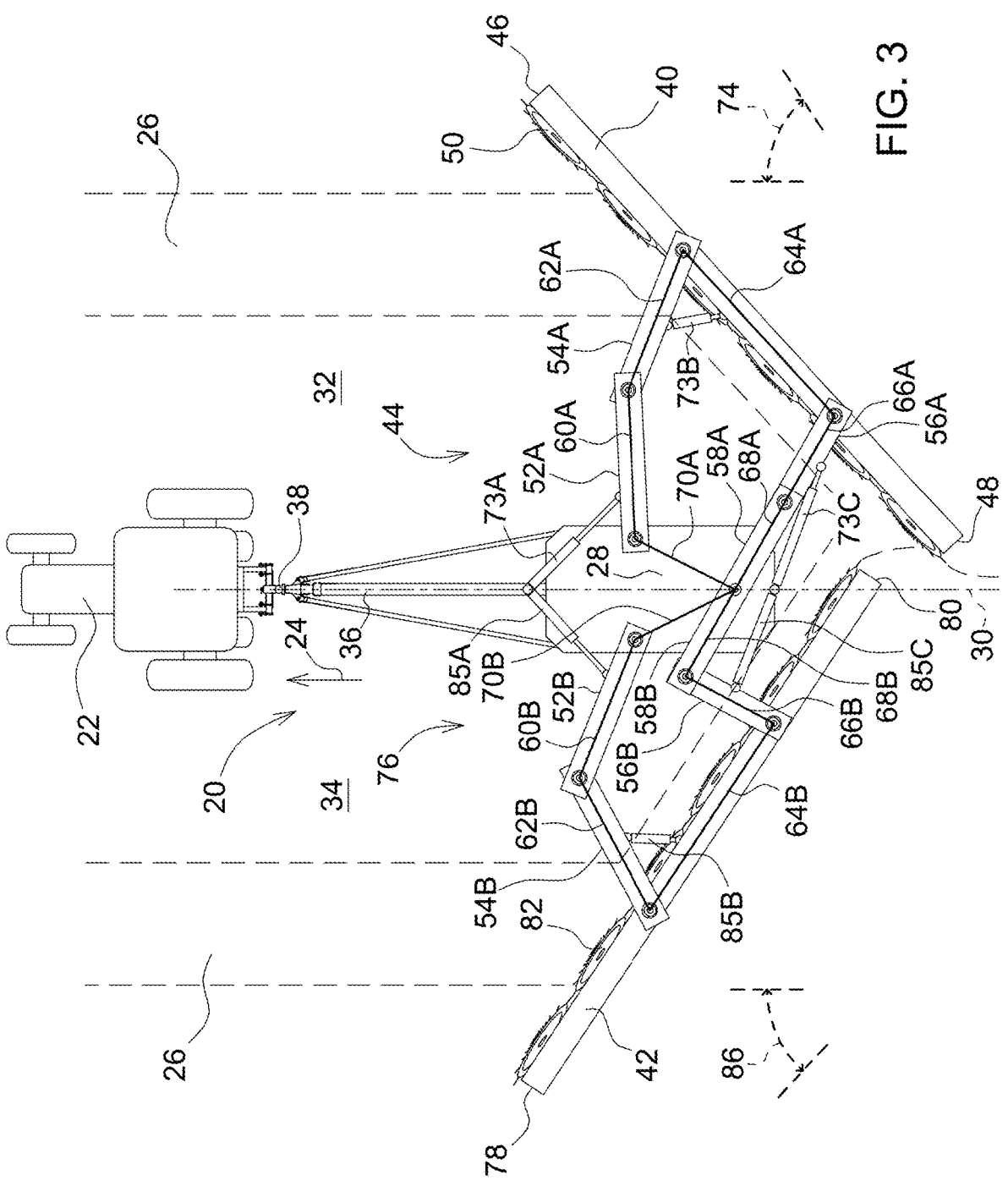
FIG. 3 is a schematic plan view of the rake implement in a second configuration.
Figure 4:
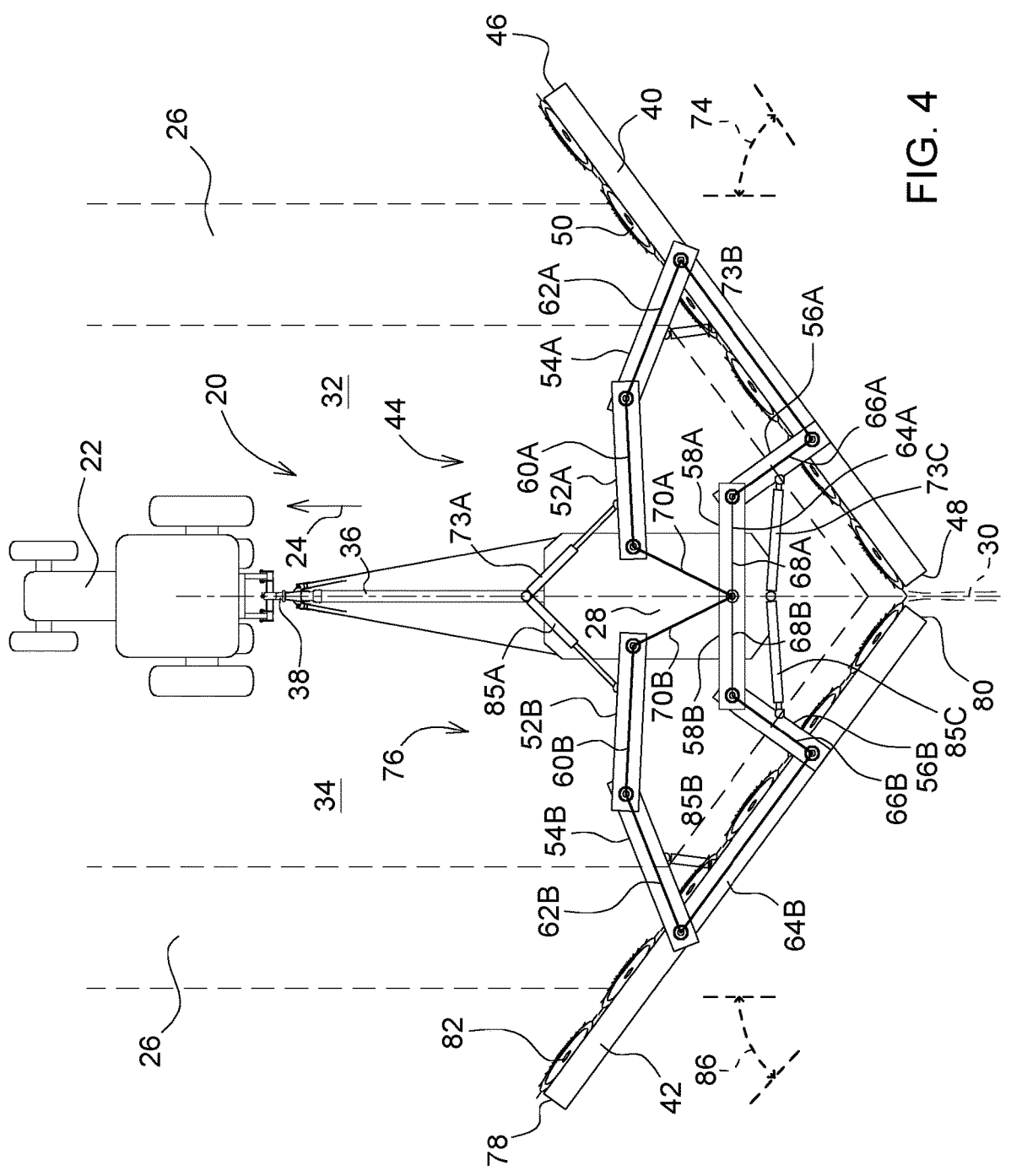
FIG. 4 is a schematic plan view of the rake implement in a third configuration.

The first actuator system 72 is configured to move the first linkage system 44 to thereby move the first arm 40 between at least a travel position of the first arm 40 (shown in FIG. 1), a first operating position of the first arm 40 (shown in FIG. 2), and a second operating position of the first arm 40 (shown in FIGS. 3 and 4).

The first arm 40 defines a lateral implement transport width on the first lateral side 32 of the frame 28 when the first arm 40 is disposed in the transport position of the first arm 40. The first arm 40 defines a lateral implement deployed width on the first lateral side 32 of the frame 28 when the first arm 40 is disposed in the first operating position of the first arm 40 or the second operating position of the first arm 40. The lateral implement transport width of the first arm 40 is less than the lateral implement deployed width of the first arm 40. For example, in one implementation of the disclosure, when the first linkage system 44 is selectively configured to position the first arm 40 relative to the frame 28 in the travel position of the first arm 40, such as shown in FIG. 1, the first arm 40 may be positioned on the first lateral side 32 of the frame 28 substantially parallel with the central longitudinal axis 30, to present a narrow implement width, whereas when the first linkage system 44 is selectively configured to position the first arm 40 in either the first operating position or the second operating position of the first arm 40, shown in FIGS. 2-4, the first arm 40 extends outward away from the central longitudinal axis 30 to present a wider implement width when compared to the transport position.

When the first linkage system 44 is selectively configured to position the first arm 40 relative to the frame 28 in the first operating position of the first arm 40, such as shown in FIG. 2, the first arm 40 is substantially non-parallel with the central longitudinal axis 30 and extends across the central longitudinal axis 30 such that the rearward end 48 of the first arm 40 is positioned on the second lateral side 34 of the frame 28 and the forward end 46 of the first arm 40 is positioned on the first lateral side 32 of the frame 28.

When the first linkage system 44 is selectively configured to position the first arm 40 relative to the frame 28 in the second operating position of the first arm 40, such as shown in FIG. 3, the first arm 40 is substantially non-parallel with the central longitudinal axis 30 and extends away from the frame 28 at an acute angle 74 relative to the central longitudinal axis 30. When in the second position of the first arm 40, both the rearward end 48 and the forward end 46 of the first arm 40 are positioned on the first lateral side 32 of the frame 28.

It should be appreciated that the first linkage system 44 may be configured via the first actuator system 72 to position the first arm 40 in an infinite number of operating positions between the first operating position of the first arm 40 and the second operating position of the first arm 40.

A second linkage system 76 interconnects the frame 28 and the second arm 42. The second arm 42 is disposed on the second lateral side 34 of the frame 28, and includes a forward end 78 and a rearward end 80 relative to the direction of travel 24. The second arm 42 may include one or more ground engaging elements, such as but not limited to tires and/or tracks, for moveably supporting the second arm 42 relative to the ground surface.

The second arm 42 includes a structure that supports a second rake system 82. The second rake system 82 is disposed on the second arm 42 and is operable to move cut crop material laterally relative to the central longitudinal axis 30. The second rake system 82 is operable to move the cut crop material from the forward end 78 of the second arm 42, inward toward the central longitudinal axis 30 and the rearward end 80 of the second arm 42. The second rake system 82 may include, but is not limited to, one or more wheel type rakes and/or a parallel bar style rake as understood by those skilled in the art. The specific features and operation of the second rake system 82 are understood by those skilled in the art, are not pertinent to the teachings of this disclosure, and are therefore not described in greater detail herein.

As described above, the second linkage system 76 interconnects the frame 28 and the first arm 40. The second linkage system 76 may include any system that moveable connects the second arm 42 to the frame 28 in a manner that enables both lateral and longitudinal movement of the rearward end 80 of the second arm 42 relative to the central longitudinal axis 30 of the frame 28. For example, the second linkage system 76 may include a plurality of linkage bars interconnecting the second arm 42 and the frame 28. In the example implementation shown in the Figures, the second linkage system 76 includes four linkage bars cooperating with the frame 28 and the second arm 42 to define a six link connection system. The four linkage bars include a first bar 52B, a second bar 54B, a third bar 56B, and a fourth bar 58B. The first bar 52B is pivotably connected to the frame 28 and pivotably connected to the second bar 54B. The second bar 54B is pivotably connected to the first bar 52B and pivotably connected to the first arm 40. The third bar 56B is pivotably connected to the first arm 40 and pivotably connected to the fourth bar 58B. The fourth bar 58B is pivotably connected to the third bar 56B and pivotably connected to the frame 28.

The six links defined by the frame 28 and the second linkage system 76 include a first link 60B, a second link 62B, a third link 64B, a fourth link 66B, a fifth link 68B, and a sixth link 70B. The first link 60B is defined by the first bar 52B and extends between the frame 28 and the second bar 54B. The second link 62B is defined by the second bar 54B and extends between the first bar 52B and the second arm 42. The third link 64B is defined by the second arm 42 and extends between the second bar 54B and the third bar 56B. The fourth link 66B is defined by the third bar 56B and extends between the second arm 42 and the fourth bar 58B. The fifth link 68B is defined by the fourth bar 58B and extends between the third bar 56B and the frame 28. The sixth link 70B is defined by the frame 28 and extends between the fourth bar 58B and the first bar 52B.

The rake implement 20 includes a second actuator system 84 interconnecting the frame 28 and one of the plurality of linkage bars of the second linkage system 76. It should be appreciated that the second actuator system 84 may include multiple actuators. For example, the second actuator system 84 may include a first actuator 85A, a second actuator 85B and a third actuator 85C. The actuators 85A, 85B, 85C may include, but are not limited to, one of a hydraulic actuator, an electric actuator, a pneumatic actuator, etc. The actuators 85A, 85B, 85C may be configured as one of, but are not limited to, a linear actuator that generates linear movement, or a rotary actuator that generates rotational movement.

The second actuator system 84 is configured to move the second linkage system 76 to thereby move the second arm 42 between a travel position of the second arm 42 (shown in FIG. 1), a first operating position of the second arm 42 (shown in FIG. 3), and a second operating position of the second arm 42 (shown in FIGS. 2 and 4).

The second arm 42 defines a lateral implement transport width on the second lateral side 34 of the frame 28 when the second arm 42 is disposed in the transport position of the second arm 42. The second arm 42 defines a lateral implement deployed width on the second lateral side 34 of the frame 28 when the second arm 42 is disposed in the first operating position of the second arm 42 or the second operating position of the second arm 42. The lateral implement transport width of the second arm 42 is less than the lateral implement deployed width of the second arm 42. For example, in one implementation of the disclosure, when the second linkage system 76 is selectively configured to position the second arm 42 relative to the frame 28 in the travel position of the second arm 42, such as shown in FIG. 1, the second arm 42 may be positioned on the second lateral side 34 of the frame 28 substantially parallel with the central longitudinal axis 30, to present a narrow implement width, whereas when the second linkage system 76 is selectively configured to position the second arm 42 in either the first operating position or the second operating position of the second arm 42, shown in FIGS. 2-4, the second arm 42 extends outward away from the central longitudinal axis 30 to present a wider implement width when compared to the transport position.

When the second linkage system 76 is selectively configured to position the second arm 42 relative to the frame 28 in a first operating position of the second arm 42, such as shown in FIG. 3, the second arm 42 is substantially non-parallel with the central longitudinal axis 30 and extends across the central longitudinal axis 30 such that the rearward end 80 of the second arm 42 is positioned on the first lateral side 32 of the frame 28 and the forward end 78 of the second arm 42 is positioned on the second lateral side 34 of the frame 28.

When the second linkage system 76 is selectively configured to position the second arm 42 relative to the frame 28 in the second operating position of the second arm 42, such as shown in FIG. 2, the second arm 42 is substantially non-parallel with the central longitudinal axis 30 and extends away from the frame 28 at an acute angle 86 relative to the central longitudinal axis 30. When in the second position of the second arm 42, both the rearward end 80 and the forward end 78 of the second arm 42 are positioned on the second lateral side 34 of the frame 28.

It should be appreciated that the second linkage system 76 may be configured via the second actuator system 84 to position the second arm 42 in an infinite number of operating positions between the first operating position of the second arm 42 and the second operating position of the second arm 42. Furthermore, while the example implementation of the disclosure describes the first linkage system 44 and the associated first actuator system 72 operating separately and independently of the second linkage system 76 and the associated second actuator system 84, it should be appreciated that in other implementations of the disclosure, the first linkage system 44 and the associated first actuator system 72 may operate simultaneously and in unison with, as a combined and coordinated movement, the second linkage system 76 and the associated second actuator system 84.

The rake implement 20 may be selectively configured for different operating conditions, needs, crop types, volumes, etc. For example, referring to FIG. 2, the first arm 40 may disposed in the first operating position of the first arm 40 and the second arm 42 may be disposed in the second operating position of the second arm 42. When configured in this manner, the rearward end 48 of the first arm 40 is positioned forward of the rearward end 80 of the second arm 42 along the central longitudinal axis 30. Additionally, when the first arm 40 is disposed in the first operating position of the first arm 40 and the second arm 42 is disposed in the second operating position of the second arm 42, the acute angle 74 of the first arm 40 relative to the central longitudinal axis 30 may be larger than the acute angle 86 of the second arm 42 relative to the central longitudinal axis 30. In this configuration, the first rake system 50 moves the crop material from the first lateral side 32 from left to right across the central longitudinal axis 30, and thereafter the second rake system 82 moves the cut crop material from the first rake system 50 back toward the central longitudinal axis 30 and deposits all of the cut crop material, gathered from both the first lateral side 32 and the second lateral side 34, in a single substantially centered windrow 26. This configuration provides a single substantially centered windrow 26 with full crop disturbance across the entire width of the rake implement 20.

In another configuration of the rake system, referring to FIG. 3, the first arm 40 may disposed in the second operating position of the first arm 40 and the second arm 42 may be disposed in the first operating position of the second arm 42. When configured in this manner, the rearward end 80 of the second arm 42 is positioned forward of the rearward end 48 of the first arm 40 along the central longitudinal axis 30. As such, when the first arm 40 is disposed in the second operating position of the first arm 40 and the second arm 42 is disposed in the first operating position of the second arm 42, the acute angle 74 of the first arm 40 relative to the central longitudinal axis 30 may be smaller than the acute angle 86 of the second arm 42 relative to the central longitudinal axis 30. In this configuration, the second rake system 82 moves the crop material from the second lateral side 34 from left to right across the central longitudinal axis 30, and thereafter the first rake system 50 moves the cut crop material back toward the central longitudinal axis 30 and deposits all of the cut crop material, gathered from both the first lateral side 32 and the second lateral side 34, in a single substantially centered windrow 26. This configuration provides a single substantially centered windrow 26 with full crop disturbance across the entire width of the rake implement 20.

Additionally, in yet another configuration of the rake implement 20, referring to FIG. 4, the first arm 40 may be disposed in the second operating position of the first arm 40 and the second arm 42 may be disposed in the second operating position of the second arm 42. In this configuration, the rearward end 48 of the first arm 40 and the rearward end 80 of the second arm 42 are substantially aligned with each other at a common axial position on the central longitudinal axis 30. Additionally, in this configuration the rearward end 48 of the first arm 40 and the rearward end 80 of the second arm 42 are laterally spaced from each other across the central longitudinal axis 30 to thereby form a traditional V-shaped center delivery rake arrangement.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A rake implement for moving cut crop material laterally to form a windrow, the rake implement comprising:
a frame having a tongue configured for attachment to a tow vehicle, wherein the frame extends along a central longitudinal axis parallel with a direction of travel, with the central longitudinal axis bisecting the frame to define a first lateral side of the frame and a second lateral side of the frame;
a first arm including a forward end and a rearward end relative to the direction of travel, wherein the first arm supports a first rake system;
a first linkage system interconnecting the frame and the first arm;
wherein the first linkage system is selectively configurable to position the first arm relative to the frame in a travel position of the first arm in which the first arm is positioned to reduce an implement width on the first lateral side of the frame for transport;
wherein the first linkage system is selectively configurable to position the first arm relative to the frame in a first operating position of the first arm in which the first arm is substantially non-parallel with the central longitudinal axis and extends away from the frame at an acute angle relative to the central longitudinal axis;

wherein the first linkage system is selectively configurable to position the first arm relative to the frame in a second operating position of the first arm in which the first arm is substantially non-parallel with the central longitudinal axis and extends away from the frame at an acute angle relative to the central longitudinal axis;
wherein the acute angle of the first arm when disposed in the first operating position of the first arm is different than the acute angle of the first arm when disposed in the second operating position of the first arm;
wherein both a rearward end and a forward end of the first rake system are positioned on the first lateral side of the frame when the first arm is disposed in the second operating position of the first arm;
a second arm including a forward end and a rearward end relative to the direction of travel, wherein the second arm supports a second rake system;
a second linkage system interconnecting the frame and the second arm;
wherein the second linkage system is selectively configurable to position the second arm relative to the frame in a travel position of the second arm in which the second arm is positioned to reduce implement width on the second lateral side of the frame for transport;
wherein the second linkage system is selectively configurable to position the second arm relative to the frame in a first operating position of the second arm in which the second arm is substantially non-parallel with the central longitudinal axis and extends away from the frame at an acute angle relative to the central longitudinal axis;
wherein the second linkage system is selectively configurable to position the second arm relative to the frame in a second operating position of the second arm in which the second arm is substantially non-parallel with the central longitudinal axis and extends away from the frame at an acute angle relative to the central longitudinal axis;
wherein the acute angle of the second arm when disposed in the first operating position of the second arm is different than the acute angle of the second arm when disposed in the second operating position of the second arm;
wherein both a rearward end and a forward end of the second rake system are positioned on the second lateral side of the frame when the second arm is disposed in the second operating position of the second arm; and
wherein the rearward end of the first rake system is positioned on the second lateral side of the frame and the forward end of the first rake system is positioned on the first lateral side of the frame when the first arm is disposed in the first operating position of the first arm.

2. The rake implement set forth in claim 1, wherein the rearward end of the first arm is positioned forward of the rearward end of the second arm along the central longitudinal axis, with a rearward end of the first rake system overlapping with a rearward end of the second rake system in a direction generally perpendicular to the central longitudinal axis, when the first arm is disposed in the first operating position of the first arm and the second arm is disposed in the second operating position of the second arm.

3. The rake implement set forth in claim 1, wherein the rearward end of the second arm is positioned forward of the rearward end of the first arm along the central longitudinal axis, with a rearward end of the second rake system overlapping with a rearward end of the first rake system in a direction generally perpendicular to the central longitudinal axis, when the first arm is disposed in the second operating position of the first arm and the second arm is disposed in the first operating position of the second arm.

4. The rake implement set forth in claim 1, wherein the rearward end of the first arm and the rearward end of the second arm are substantially aligned with each other at a common axial position on the central longitudinal axis when the first arm is disposed in the second operating position of the first arm and the second arm is disposed in the second operating position of the second arm.

5. The rake implement set forth in claim 1, wherein the rearward end of the first arm and the rearward end of the second arm are laterally spaced from each other in a direction generally perpendicular to the central longitudinal axis when the first arm is disposed in the second operating position of the first arm and the second arm is disposed in the second operating position of the second arm.

6. The rake implement set forth in claim 1, wherein the first linkage system includes a plurality of linkage bars.

7. The rake implement set forth in claim 6, wherein the first linkage system includes four linkage bars cooperating with the frame and the first arm to define a six link connection system.

8. The rake implement set forth in claim 1, further comprising a first actuator system interconnecting the frame and the first linkage system, wherein the first actuator system is configured to move the first linkage system to move the first arm between the travel position of the first arm, the first operating position of the first arm, and the second operating position of the first arm.

9. The rake implement set forth in claim 1, wherein the second linkage system includes a plurality of linkage bars.

10. The rake implement set forth in claim 9, wherein the second linkage system includes four linkage bars cooperating with the frame and the second arm to define a six link connection system.

11. The rake implement set forth in claim 1, further comprising a second actuator system interconnecting the frame and the second linkage system, wherein the second actuator system is configured to move the second linkage system to move the second arm between the travel position of the second arm, the first operating position of the second arm, and the second operating position of the second arm.

12. The rake implement set forth in claim 1, wherein the first rake system is operable to move crop material laterally relative to the central longitudinal axis, from the forward end of the first arm toward the rearward end of the first arm.

13. The rake implement set forth in claim 1, wherein the second rake system is operable to move crop material laterally relative to the central longitudinal axis, from the forward end of the second arm toward the rearward end of the second arm.

14. The rake implement set forth in claim 1, wherein when the first arm is disposed in the first operating position of the first arm and the second arm is disposed in the second operating position of the second arm, the acute angle of the second arm relative to the central longitudinal axis is smaller than the acute angle of the first arm relative to the central longitudinal axis.

15. The rake implement set forth in claim 1, wherein when the first arm is disposed in the second operating position of the first arm and the second arm is disposed in the first operating position of the second arm, the acute angle of the first arm relative to the central longitudinal axis is smaller than the acute angle of the second arm relative to the central longitudinal axis.

16. The rake implement set forth in claim 1, wherein the first linkage system and the second linkage system are connected and simultaneously moveable in a coordinated motion to move the first arm and the second arm between at least two of their respective travel positions, their respective first operating positions, or their respective second operating positions.

17. The rake implement set forth in claim 1, wherein the first arm is substantially parallel with the central longitudinal axis when the first arm is disposed in the transport position of the first arm.

18. The rake implement set forth in claim 1, wherein the first arm defines a lateral implement transport width on the first lateral side of the frame when the first arm is disposed in the transport position of the first arm, and wherein the first arm defines a lateral implement deployed width on the first lateral side of the frame when the first arm is disposed in the first operating position of the first arm or the second operating position of the first arm, with the lateral implement transport width of the first arm less than the lateral implement deployed width of the first arm.

19. The rake implement set forth in claim 1, wherein the second arm is substantially parallel with the central longitudinal axis when the second arm is disposed in the transport position of the second arm.

20. The rake implement set forth in claim 1, wherein the second arm defines a lateral implement transport width on the second lateral side of the frame when the second arm is disposed in the transport position of the second arm, and wherein the second arm defines a lateral implement deployed width on the second lateral side of the frame when the second arm is disposed in the first operating position of the second arm or the second operating position of the second arm, with the lateral implement transport width of the second arm less than the lateral implement deployed width of the second arm.

21. The rake implement set forth in claim 1, wherein the rearward end of the second rake system is positioned on the first lateral side of the frame and the forward end of the second rake system is positioned on the second lateral side of the frame when the second arm is disposed in the first operating position of the second arm.

22. A rake implement for moving cut crop material laterally to form a windrow, the rake implement comprising:

a frame having a tongue configured for attachment to a tow vehicle, wherein the frame extends along a central longitudinal axis parallel with a direction of travel, with the central longitudinal axis bisecting the frame to define a first lateral side of the frame and a second lateral side of the frame;

a first arm including a forward end and a rearward end relative to the direction of travel, wherein the first arm supports a first rake system;

a first linkage system interconnecting the frame and the first arm;

wherein the first linkage system is selectively configurable to position the first arm relative to the frame in a travel position of the first arm in which the first arm is positioned to reduce an implement width on the first lateral side of the frame for transport;

wherein the first linkage system is selectively configurable to position the first arm relative to the frame in a first operating position of the first arm in which the first arm is substantially non-parallel with the central longitudinal axis and extends away from the frame at an acute angle relative to the central longitudinal axis;

wherein the first linkage system is selectively configurable to position the first arm relative to the frame in a second operating position of the first arm in which the first arm is substantially non-parallel with the central longitudinal axis and extends away from the frame at an acute angle relative to the central longitudinal axis;

wherein the acute angle of the first arm when disposed in the first operating position of the first arm is different than the acute angle of the first arm when disposed in the second operating position of the first arm;

wherein both a rearward end and a forward end of the first rake system are positioned on the first lateral side of the frame when the first arm is disposed in the second operating position of the first arm;

a second arm including a forward end and a rearward end relative to the direction of travel, wherein the second arm supports a second rake system;

a second linkage system interconnecting the frame and the second arm;

wherein the second linkage system is selectively configurable to position the second arm relative to the frame in a travel position of the second arm in which the second arm is positioned to reduce implement width on the second lateral side of the frame for transport;

wherein the second linkage system is selectively configurable to position the second arm relative to the frame in a first operating position of the second arm in which the second arm is substantially non-parallel with the central longitudinal axis and extends away from the frame at an acute angle relative to the central longitudinal axis;

wherein the second linkage system is selectively configurable to position the second arm relative to the frame in a second operating position of the second arm in which the second arm is substantially non-parallel with the central longitudinal axis and extends away from the frame at an acute angle relative to the central longitudinal axis;

wherein the acute angle of the second arm when disposed in the first operating position of the second arm is different than the acute angle of the second arm when disposed in the second operating position of the second arm;

wherein both a rearward end and a forward end of the second rake system are positioned on the second lateral side of the frame when the second arm is disposed in the second operating position of the second arm; and wherein the rearward end of the second rake system is positioned on the first lateral side of the frame and the forward end of the second rake system is positioned on the second lateral side of the frame when the second arm is disposed in the first operating position of the second arm.

* * * * *